(12) United States Patent
Du Plessis et al.

(10) Patent No.: US 6,876,096 B2
(45) Date of Patent: Apr. 5, 2005

(54) ELECTRICAL POWER GENERATION UNIT

(76) Inventors: Deon John Du Plessis, 17 Yelanda Street, The Reeds, Centurion (ZA), 0158; Jan Johannes Du Plessis, 12 Canberra Lane, Impala Park (ZA), 1460

( * ) Notice: Subject to any disclaimer, the term of this patent is extended or adjusted under 35 U.S.C. 154(b) by 136 days.

(21) Appl. No.: 10/257,746

(22) PCT Filed: Feb. 20, 2001

(86) PCT No.: PCT/ZA01/00021
§ 371 (c)(1),
(2), (4) Date: May 19, 2003

(87) PCT Pub. No.: WO02/066196
PCT Pub. Date: Aug. 29, 2002

(65) Prior Publication Data
US 2003/0178853 A1 Sep. 25, 2003

(51) Int. Cl.[7] .................................. H02P 9/04
(52) U.S. Cl. .................... 290/4 C; 290/1 A; 322/2; 322/27
(58) Field of Search ............... 290/1 A, 4 R, 290/4 C; 322/7, 9, 14, 27

(56) References Cited

U.S. PATENT DOCUMENTS

| | | |
|---|---|---|
| 2,671,860 A | 3/1954 | Bevins |
| 2,976,424 A | 3/1961 | Anderson |
| 3,895,212 A | 7/1975 | Maxwell et al. |
| 4,015,189 A | 3/1977 | Gorden |
| 4,314,195 A | 2/1982 | Muter |
| 4,336,486 A | 6/1982 | Gorden et al. |
| 4,830,412 A | 5/1989 | Raad et al. |
| 4,908,565 A | 3/1990 | Cook et al. |
| 4,967,097 A | 10/1990 | Mehl |
| 5,013,929 A | 5/1991 | Dhyanchand |
| 5,444,214 A | 8/1995 | Crouse et al. |
| 5,670,070 A | 9/1997 | Clark et al. |
| 5,714,821 A | 2/1998 | Dittman |
| 5,734,147 A | 3/1998 | Bunker et al. |
| 5,764,036 A * | 6/1998 | Vaidya et al. .................. 322/90 |
| 5,808,450 A * | 9/1998 | Chula et al. .................. 322/22 |
| 5,968,385 A | 10/1999 | Beeson et al. |
| 6,005,220 A | 12/1999 | Bunker et al. |
| 6,040,556 A | 3/2000 | Shinya et al. |
| 6,067,945 A | 5/2000 | Fukuda et al. |
| 6,104,096 A | 8/2000 | Hicks |
| 6,111,390 A * | 8/2000 | Inaba et al. .................. 322/28 |
| 6,121,691 A | 9/2000 | Renner |
| 6,274,944 B1 | 8/2001 | Letang |
| 6,291,903 B1 | 9/2001 | Horibe |
| 6,590,298 B1 * | 7/2003 | Du Plessis ............... 290/40 C |
| 6,784,634 B2 * | 8/2004 | Sweo ....................... 318/727 |

FOREIGN PATENT DOCUMENTS

| | | |
|---|---|---|
| CH | 313664 | 6/1956 |
| DE | 931 791 | 8/1955 |
| FR | 2 401 736 | 3/1979 |
| FR | 2 626 726 | 8/1989 |
| JP | 54 135938 | 10/1979 |
| JP | 57-101548 | 6/1982 |
| WO | 99/61193 | 12/1999 |

* cited by examiner

Primary Examiner—Nicholas Ponomarenko
(74) Attorney, Agent, or Firm—Merchant & Gould P.C.

(57) ABSTRACT

The invention provides a power generation unit (100) having a generator (8) driven from shaft (112) and which has a transformer (24) connected to its output terminals for transforming the output voltage from 220V AC to a required voltage of 18V AC peak-to-peak. One or more secondary generators (20) in the form of standard vehicle 3-phase AC alternators are driveable by the shaft (112). The first generator (8) transformer output terminals are connected to a rectifier circuit where the transformer output of 18 V AC peak-to-peak is rectified to the excitation voltage of the one or more secondary generators field coils such that the total transformed electrical power of the transformer (24), after being rectified, is used to excite or energise these field coils which in turn generates an electrical output at the output terminal diode banks (21) which is fed to the welding cable connector terminals (15).

19 Claims, 4 Drawing Sheets

ELECTRICAL POWER GENERATION UNIT

FIELD OF THE INVENTION

The Invention relates to an electrical power generation unit and to a portable welding unit.

BACKGROUND TO THE INVENTION

The inventor has found that in conventional electrical generation units of the type having a generator which must be excited or energised to produce an electrical energy output, as soon as a loading is applied to the output the electrical energy output drops. This problem is particularly acute in portable welding machines where the loading during welding is of such a nature that it can virtually shutdown the generator unless its drive means is substantially oversized. Likewise this problem is also acute in any high current application where the generator unit is required to provide a sustained high current.

SUMMARY OF THE INVENTION

According to a first aspect of the invention there is provided an electrical power generation unit including
drive means for driving a drive shaft;
a first electrical generator which is configured to be connected to and driven by the drive shaft in use;
one or more secondary electrical generator which is configured to be connected to and driven by the drive shaft; and
the total output of the first electrical generator being transformed by a transformer to an excitation voltage sufficient to excite or energise field coils of the one or more secondary generator to a voltage not exceeding the saturation voltage of the field coils of the one or more secondary generator, thereby to effect electromechanical feedback regulation of the output current from the one or more secondary generator to smooth out fluctuations in the output energy delivered by the one or more secondary generator under a sustained loading condition as well as to smooth out fluctuations in the output energy delivered by the first generator.

The first electrical generator may be an AC generator also known as an alternator.

The AC alternator may provide 110 V AC single phase, 220V AC single phase, 240 V AC single phase, 380V AC 3 phase or 550V AC 3 phase electrical power at 50 Hz, 60 Hz, or other desired frequency. The AC alternator may be of the self excited type having a residual magnetism which permits the alternator to be started without an external excitation voltage.

The transformer may be a torroidal transformer configured to provide an AC output of about 18 V peak-to-peak from a 220 V AC input, or any other required output voltage according to the well known principles of the operation of transformers. The output of the transformer may be rectified to the excitation voltage of the one or more secondary generators field coils.

Typically, the AC generator is mounted on a free end of the drive shaft. However, it may be mounted in any position and be driven by a belt and pulley system driven by the drive shaft, or a gear arrangement driven by the drive shaft.

The secondary electrical generator may be an AC alternator having field coils. Typically, this AC alternator is a standard 3-phase vehicle alternator used as a welding alternator, such as those available from Bosch and having a 55 Amp, 90 Amp, or other current output as required but limited by the output power of the drive means.

The 3-phase welding alternator may be wired in delta configuration rather than the star configuration normally associated with such alternators.

The one or more secondary generators may be connected to the drive shaft by a belt and pulley system. The diameter of the pulley on the drive shaft may be selected so that, together with the operating characteristics of the first and secondary generators, a desired output current at a specified voltage is available from each of the one or more secondary generators.

Where the connection to the drive shaft is by means of a belt and pulley system, the belt may be kept in tension by a tensioner having an off-center axis and rotatable around that axis to alter the pulley belt perimeter length thereby to tension said belt. The belt is typically a multi-ply V-belt.

The first generator may be selected to be capable of supplying electrical power matching the power requirements of an electrical appliance to be energised. To this end one or more socket arrangements for accepting the plug ends of appliances may be provided, the one or more socket arrangements being in electrical communication with the output contacts of the first generator.

The drive means may be selected to be capable of supplying electrical power corresponding to the ratio of the aggregate maximum power characteristic of the one or more secondary generator divided by the calibrated efficiency factor of the one or more secondary generator.

The electrical power generation unit may include an output socket circuit connectable to permit electrical communication between any suitable tool and the power generation unit. Typically the output socket is a standard 3-pin type socket.

The electrical power generation unit may include a 3 phase rectifier and associated circuitry connectable to the one or more secondary generator to form a welding unit having its own electrical power generation means.

Several of the secondary generators may be wired in parallel to increase the output current for high current welding applications, and other high current demand applications.

Several of the secondary generators may be wired in series to increase the output voltage for gouging applications.

The output of the secondary generators may be configurable by selecting the number of secondary generators to operate in parallel or in series by means of a switching arrangement.

Further control over the output of the secondary generators may be effected by means of a voltage adjustment circuit located operationally between the transformer output and one or more of the secondary generators' field coils whereby the excitation voltage to the field coils of one or more of the secondary generators may be varied independently of the loading on said secondary generators.

The power generation unit may include a battery charger circuit connectable to the power generation unit, for charging a battery connected to the battery charger or for boost starting an engine such as a vehicle engine when the battery usually employed for this purpose is inoperative.

The power generation unit may include a selector switch for selectively nominating between the circuits described above.

The electrical power generation unit may include a transportable mounting frame for facilitating the transportation of the unit. Typically, the mounting frame is a tubular cage having access openings for operator access to the power generation unit.

The mounting frame may however consist of a number of panels which form a housing for the power generation unit while also providing structural support for the unit.

The drive means may be a fuel powered motor connectable to the drive shaft. The motor may be a petrol or diesel engine connectable to the drive shaft. The selection of petrol or diesel being an operational decision based on the surrounding circumstances such as fuel availability. In a specific embodiment the drive means may be an electric motor.

The invention extends to a transportable welding unit including a power generation unit as described above.

The invention further extends to a method of providing a substantially stable supply of electrical energy under sustained loading conditions including the steps of:

connecting a first generator to a drive shaft of a drive means;

connecting one or more secondary generator to the drive shaft;

transforming the total output voltage of the first generator to a voltage sufficient to excite the coils of the one or more secondary generator but below the saturation voltage of said one or more secondary generator; and electrically connecting the transformed output of the first generator to the second generator such that, in use, the output from the transformer is used to excite or energise field coils of the one or more secondary generator so that electromechanical feedback control of the output of the one or more secondary generator is effected.

DESCRIPTION OF THE DRAWINGS

The invention will now be described, by way of non-limiting example only with reference to the accompanying diagrammatic drawings.

In the drawings,

In FIGS. 1, 2 and 3, reference numeral 100 generally indicates a transportable welding unit, broadly in accordance with the invention. The welding unit 100 has mechanical drive means in the form of a diesel engine 16, an electrical power generation unit 8 operativley connected to the engine 16 and having 3-pin 220 V AC output sockets 28 and welding cable connector terminals 15, all mounted in a transportable mounting frame 110 in the form of a trolley type housing.

The petrol engine 16 has a drive shaft 112 driveable by the engine 16 and a first generator 8, in the form of a Leroy Somer Partner LSA 35 M7 "E" alternator delivering 220V/380V, is mounted on the free end of the drive shaft 112 and coupled to the shaft 112 by means of a rubber coupling 18.

Figure 1:
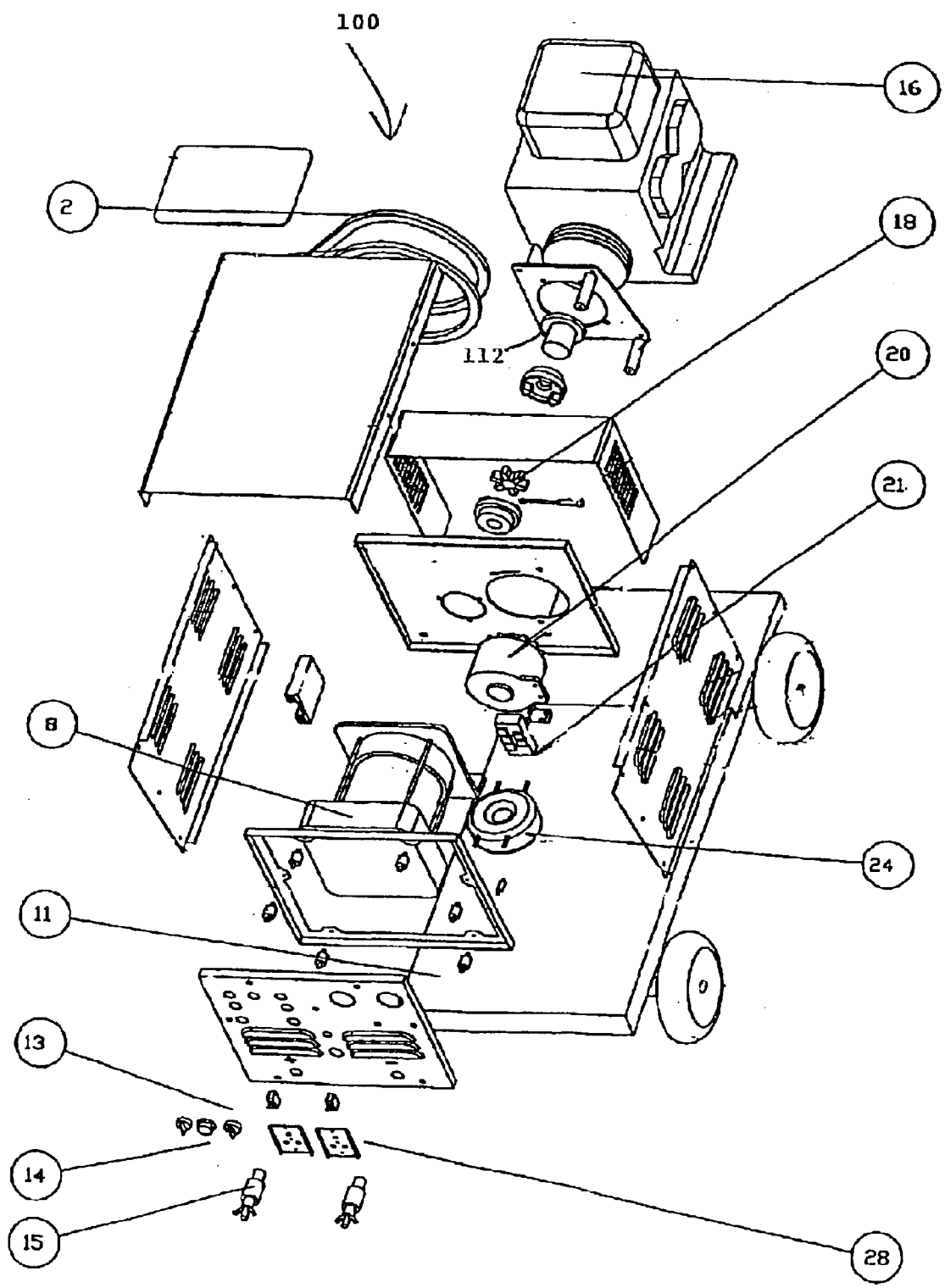
FIGS. 1 to 3 show, in exploded view, pictorial three dimensional views, of a portable welding unit having an electrical power generation unit in accordance with the invention having one, two, and three secondary generators.
Figure 2:
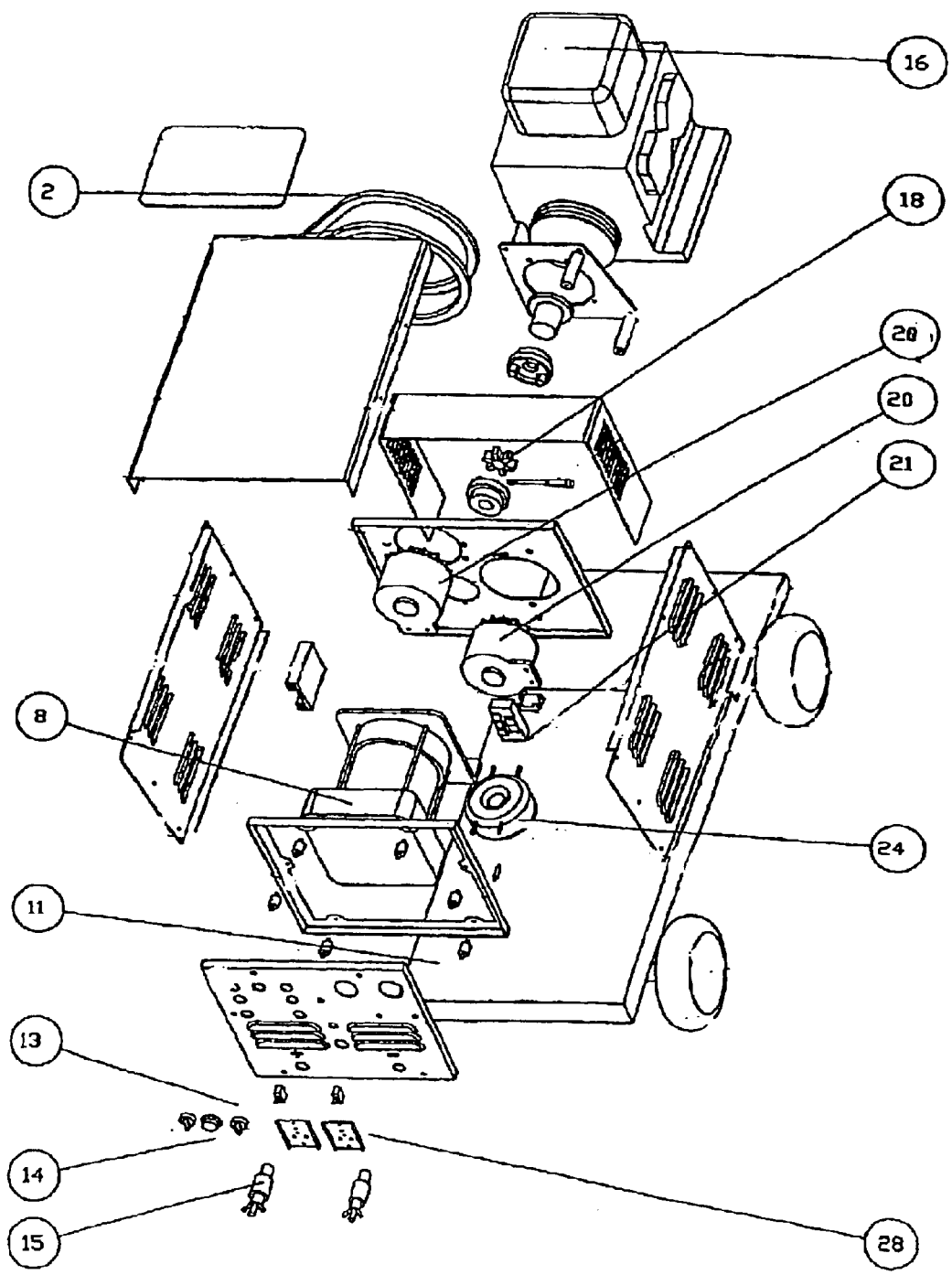
Figure 3:
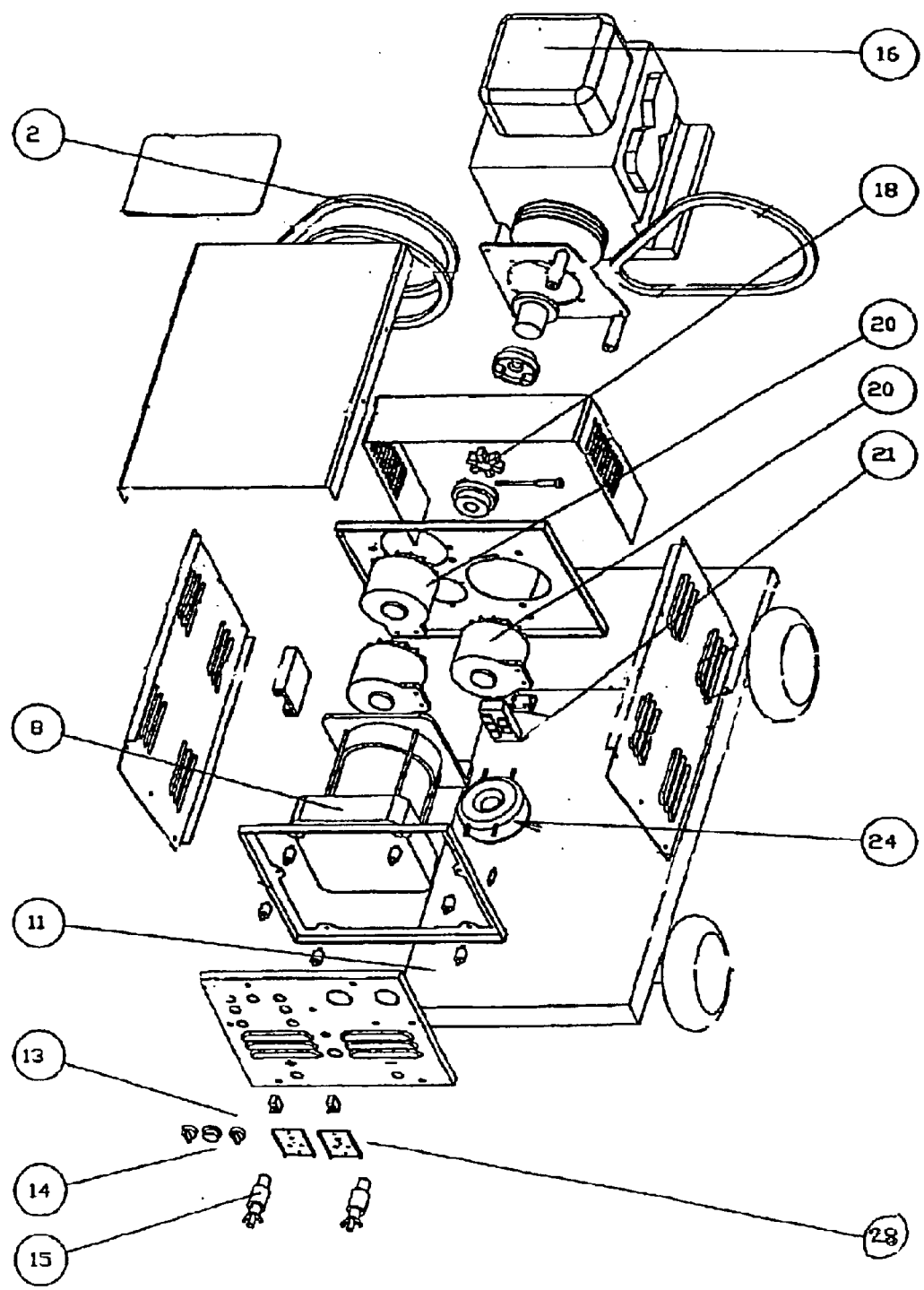

The first generator 8 has a transformer 24 connected to its output terminals for transforming the output voltage from 220V AC to a required voltage of 18V AC peak-to-peak. One (FIG. 1), two (FIG. 2) or three (FIG. 3) secondary generators 20 in the form of standard vehicle 3-phase AC alternators of 90 AMP output capability, such as available from Bosch, are mounted remotely from the shaft 112 and are driveable by the shaft 112 by means of a pulley system 2. The first generator 8 transformer output terminals are connected to a rectifier circuit where the transformer output of 18 V AC peak-to-peak is rectified to the excitation voltage of the one or more secondary generators field coils and the rectifier circuit output terminals are connected to the secondary generators 20 field coil input terminals by means of electrical cables, such that the total transformed electrical power of the transformer 24, after being rectified, is used to excite or energise these field coils which in turn generates an electrical output at the output terminal diode banks 21 which is fed to the welding cable connector terminals 15.

The pulley system comprises a 162 mm 2 belt pulley arrangement driven at 3000 rpm and driving the generator 8 to provide a 220 V output. This configuration provides a 160 A DC welding current from the Bosch 90 Amp welding alternator 20 at a voltage of between 22V and 28V, having an open circuit voltage of between 65V and 70 V.

In use, the engine is started by a user thereby causing the drive shaft 112 to rotate at the speed of the engine crank shaft (not shown). As the drive shaft rotates so the rotor of the first generator 8 is rotated thereby generating an output current at a potential difference of 220 V AC across the terminals at an engine speed of 3000 rpm (typical). The transformer 24 then transforms this output to 18 V AC peak-to-peak which is rectified to about 13.8 V DC and applied across the field coil input terminals of the secondary generators 20.

The rotor shaft of the secondary generators is driven by the pulley system 2 in parallel to the first generator 8, the speed of rotation being fixed by the diameter of the pulleys and the engine revolutions. As a current loading is applied to the output terminals 15 (diode banks 21) of the secondary generators 20 they initially exhibit a natural tendency to retard the rotation of the rotor shaft and thus drive shaft 112 due to magnetisation of the field coils and rotor.

This retardation causes the engine 16 speed to drop and thus the speed of rotation of the shaft 112 which in turn leads to a reduced voltage across the first generator 8 terminals and thus the transformer 24 output voltage to below 18V AC peak-to-peak. The reduced voltage from the transformer 24 leads to a reduced voltage at the output terminals of the rectifier circuit, and thus the secondary generators 20 field coil input terminals, thereby reducing the excitation of these field coils and thus the output from the alternators 20 at output terminals 15 (diode banks 21). This reduced output in turn reduces the retardation on the drive shaft 112 permitting the engine speed 16 to stabilise at an operating point at which the output from welding terminals 15 and the excitation voltage at the filed coil terminals are in balance.

An electromechanical feedback loop for regulating the output from the secondary generators is thus established and will respond in a similar fashion to any subsequent changes in loading conditions.

The welding unit 100 has switches 13 which permit selection of the number of secondary generators 20 to operate in parallel or in series to provide either an increased current output or voltage at the terminal 15.

The welding unit 100 further has a variable control switch 14 which permits variation of the output voltage of the transformer 24 between 0V and 18V AC peak-to-peak, and thus 0V to 13.8V DC from the rectifier circuit, thereby to permit control over the output of the secondary generators 20 by varying the excitation voltage to the field coils of one of the secondary generators.

Figure 4:
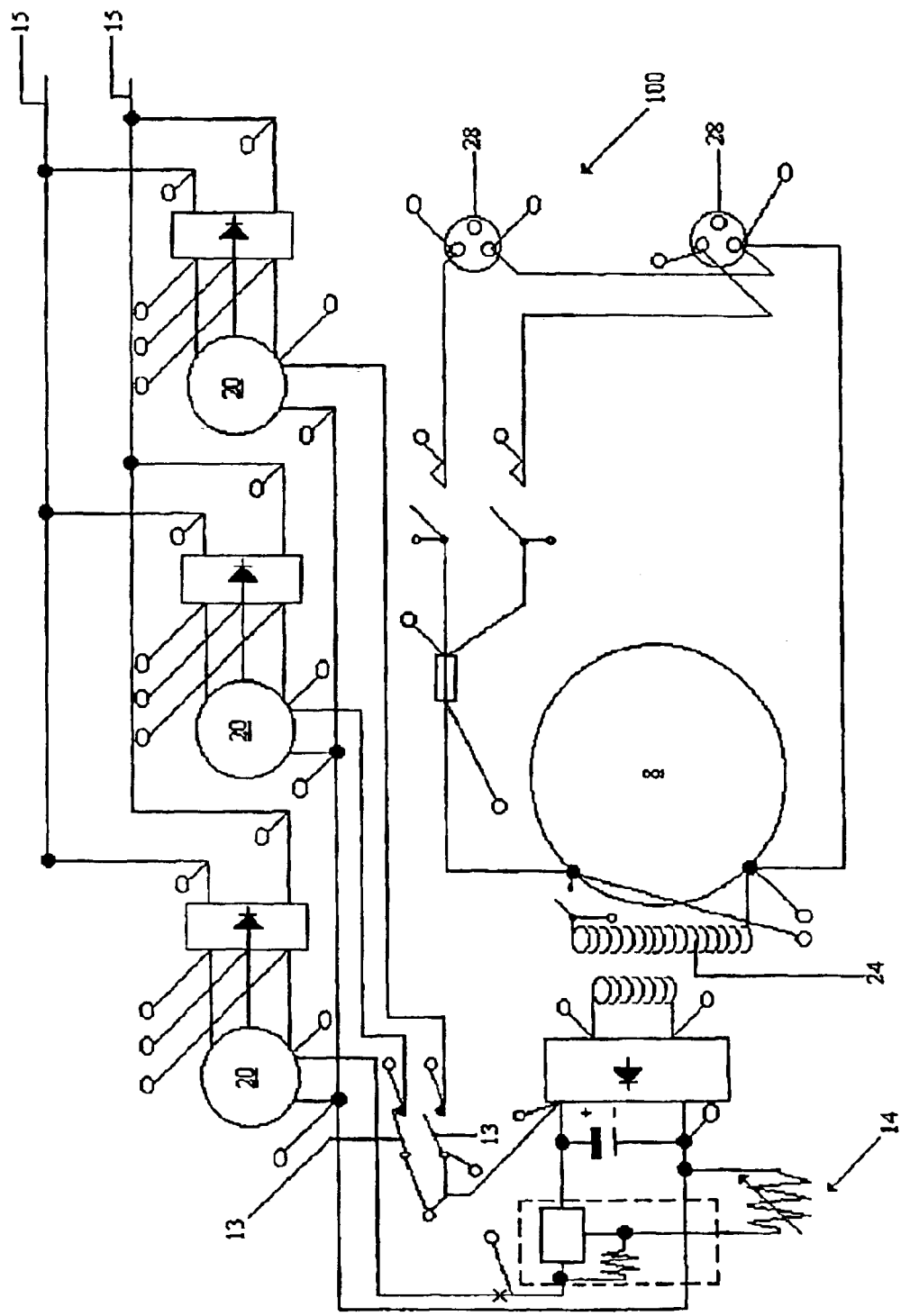
FIG. 4 shows a schematic representation of the circuit of the electrical power generation unit.

FIG. 4 shows a simplified circuit diagram of the welding unit 100 including the power output sockets 28 and the welding cable connecting terminals 15. The circuit diagram shows that the voltage output of the primary generator 8 is transformed by a torroidal transformer 24 from 220 V AC to 18 V AC peak-to-peak, whereafter this transformed output is rectified and applied across the terminals of the field coils of the secondary generators 20 for excitation of the these field coils. This voltage may be varied by the voltage adjustment circuit 14 to allow only a desired current output from the secondary generators 20 by limiting the excitation voltage of the field coils to between 0V and 13,8V DC. Switches 13 are also provided to permit operation of some or all of the secondary generators 20 simultaneously. The outputs of the secondary generators 20 are wired in delta and rectified to provide the required output for welding. A separate 220 V AC supply circuit is connected to the first generator 8 output and is used to provide a 220 V output to the pair of switched sockets 28.

The Inventor believes that it is an advantage of the invention, as illustrated, that an electrical power generation unit having a true 100% duty cycle is provided without the need to substantially oversize the drive engine to provide for loading conditions. The Inventor believes that it is a further advantage of the invention, as illustrated, that a portable welding unit is provided, which has a 100% duty cycle, while being lighter and smaller than conventional equivalent duty cycle power generation units, and in addition having accessories which permit a user to power power tools therefrom.

Furthermore, the inventor believes that it is yet a further advantage of a multiple welding alternator embodiment that either several users may weld simultaneously, or it may supply an increased current or voltage output.

What is claimed is:

1. An electrical power generation unit including
   drive means for driving a drive shaft;
   a first electrical generator which is configured to be connected to and driven by the drive shaft in use;
   one or more secondary electrical generator which is configured to be connected to and driven by the drive shaft; and
   the total output of the first electrical generator being transformed by a transformer to an excitation voltage sufficient to excite or energise field coils of the one or more secondary generator to a voltage not exceeding the saturation voltage of the field coils of the one or more secondary generator, thereby to effect electromechanical feedback regulation of the output current from the one or more secondary generator to smooth out fluctuations in the output energy delivered by the one or more secondary generator under a sustained loading condition as well as to smooth out fluctuations in the output energy delivered by the first generator.

2. An electrical power generation unit as claimed in claim 1, wherein the first electrical generator is an AC generator.

3. An electrical power generation unit as claimed in claim 2, wherein the AC generator is an AC alternator of the self starter type having a residual magnetism which permits the alternator to be started without an excitation voltage.

4. An electrical power generation unit as claimed in claim 1, wherein the transformer is a torroidal transformer configured to provide an output of about 18 V AC peak-to-peak from a 220 V AC input.

5. An electrical power generation unit as claimed in claim 1, wherein the secondary electrical generator is an AC alternator having field coils and having is output wired in delta configuration.

6. An electrical power generation unit as claimed in claim 1, wherein the one or more secondary generator is driven from the same shaft as the first generator by means of a belt and pulley system in which the belt is kept in tension by a tensioner having an off-center axis and rotatable around that axis to alter the pulley belt perimeter length thereby to tension said belt.

7. An electrical power generation unit as claimed in claim 1, wherein the drive means is selected to be capable of supplying electrical power corresponding to the ratio of the aggregate maximum power characteristic of the one or more secondary generator divided by the calibrated efficiency factor of the one or more secondary generator.

8. An electrical power generation unit as claimed in claim 1, which includes a voltage regulator circuit connectable to a transformer on the output of the first generator for regulating the output voltage of the transformer at a predetermined voltage.

9. An electrical power generation unit as claimed in claim 1, wherein the electrical power generation unit includes one or more 3-phase rectifier and associated circuitry connectable to the one or more secondary generator to form a welding unit having its own electrical power generation means.

10. An electrical power generation unit as claim in claim 1, wherein two or more of the secondary generators are switchable for connection in parallel to increase the output current for high current welding application, and other high current demand applications.

11. An electrical power generation unit as claimed in claim 1, wherein two or more of the secondary generators are switchable for connection in series to increase the output voltage for gouging applications.

12. An electrical power generation unit as claimed in claim 1, wherein the output of two or more the secondary generators is configurable by selecting the number of secondary generators to operate in parallel by means of a switching arrangement.

13. An electrical power generation unit as claimed in claim 1, wherein the output of two or more of the secondary generators is configurable by selecting the number of secondary generators to operate in series by means of a switching arrangement.

14. An electrical power generation unit as claimed in claim 12, wherein control over the output of the secondary generators is effected by means of a voltage adjustment circuit located operationally between the transformer output and one or more of the secondary generators' field coils whereby the excitation voltage to the field coils of one or more of the secondary generators may be varied independently of the loading on said secondary generators.

15. An electrical power generation unit as claimed in claim 13, wherein control over the output of the secondary generators is effected by means of a voltage adjustment circuit located operationally between the transformer output and one or more of the secondary generators' field coils whereby the excitation voltage to the field coils of one or more of the secondary generators may be varied independently of the loading on said secondary generators.

16. An electrical power generation unit as claimed in claim 1 wherein a mounting frame for the drive means, the first generator and the one or more second generator is provided which includes a number of panels which form a housing for the power generation unit while also providing structural support for the unit.

17. An electrical power generation unit as claim in claim 1, wherein the drive means is a fuel powered motor connectable to the drive shaft.

18. A transportable welding unit including an electrical power generation unit as claimed in claim 1.

19. A method of providing a substantially stable supply of electrical energy under sustained loading conditions including the steps of: connecting a first generator to a drive shaft of a drive means; connecting one or more secondary generator to the drive shaft; transforming the total output voltage of the first generator to a voltage sufficient to excite the coils of the one or more secondary generator but below the saturation voltage of said one or more secondary generator; and electrically connecting the transformed output of the first generator to the second generator such that, in use, the output from the transformer is used to excite or energize field coils of the one or more secondary generator so that electromechanical feedback control of the output of the one or more secondary generator is effected.

* * * * *